(12) United States Patent
Yamane et al.

(10) Patent No.: US 11,868,139 B2
(45) Date of Patent: Jan. 9, 2024

(54) MOVEMENT CONTROL SYSTEM, MOVEMENT CONTROL METHOD, AND NON-TRANSITORY COMPUTER READABLE MEDIUM

(71) Applicant: KABUSHIKI KAISHA TOSHIBA, Tokyo (JP)

(72) Inventors: Yoshikazu Yamane, Shinagawa Tokyo (JP); Noriyuki Hirayama, Fuchu Tokyo (JP); Michio Yamashita, Inagi Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/939,995

(22) Filed: Sep. 8, 2022

(65) Prior Publication Data

US 2023/0140600 A1 May 4, 2023

(30) Foreign Application Priority Data

Oct. 29, 2021 (JP) ................................ 2021-178065

(51) Int. Cl.
*G05D 1/02* (2020.01)

(52) U.S. Cl.
CPC .......... *G05D 1/0276* (2013.01); *G05D 1/0234* (2013.01); *G05D 2201/0216* (2013.01)

(58) Field of Classification Search
CPC .......................... G05D 1/0276; G05D 1/0234
USPC ............................................................. 701/24
See application file for complete search history.

(56) References Cited

U.S. PATENT DOCUMENTS

| 10,768,636 | B2* | 9/2020 | Yamaguchi | G05D 1/0289 |
| 11,281,216 | B2* | 3/2022 | Donnelly | G01C 21/3438 |
| 11,584,009 | B2* | 2/2023 | Chu | B25J 9/1666 |
| 11,586,221 | B2* | 2/2023 | Aisu | G05D 1/0289 |
| 11,643,114 | B2* | 5/2023 | Suzuki | G06Q 10/083 |
| | | | | 701/26 |
| 2016/0266578 | A1* | 9/2016 | Douglas | G05D 1/0282 |
| 2018/0329429 | A1 | 11/2018 | Yamaguchi et al. | |
| 2020/0050198 | A1 | 2/2020 | Donnelly | |
| 2021/0286373 | A1 | 9/2021 | Aisu et al. | |

FOREIGN PATENT DOCUMENTS

JP 2014186693 A 10/2014

\* cited by examiner

*Primary Examiner* — Andrew Joseph Rudy
(74) *Attorney, Agent, or Firm* — Holtz, Holtz & Volek PC

(57) ABSTRACT

According to one embodiment, a movement control system includes a receiver configured to receive start information for deciding a start order from which execution of an operation plan is started, the operation plan including a plurality of orders for controlling a movable object; and an operation plan executor configured to start the execution of the operation plan from the start order decided based on the start information.

21 Claims, 15 Drawing Sheets

| PLAN ID | COMMAND ID | START INFORMATION | COMMAND |
|---|---|---|---|
| 0 | 0 | | Com (WORK) |
| | 1 | B | Com (MOVE TO C) |
| 1 | 0 | | Com (WARNING SOUND) |
| | 1 | C | Com (WORK) |
| | 2 | | Com (MOVE TO D) |
| 2 | 0 | D | Com (MOVE TO E) |
| | 1 | | Com (WARNING SOUND) |
| | 2 | | Com (WORK) |

FIG. 3

| PLAN ID | COMMAND ID | START INFORMATION | COMMAND |
|---|---|---|---|
| 0 | 0 | | Com (WORK) |
| | 1 | | Com (MOVE TO C) |
| 1 | 0 | Sound1 | Com (WARNING SOUND) |
| | 1 | | Com (WORK) |
| | 2 | Goto2 | Com (MOVE TO D) |
| 2 | 0 | | Com (MOVE TO E) |
| | 1 | | Com (WARNING SOUND) |
| | 2 | Work3 | Com (WORK) |

FIG. 10

| PLAN ID | COMMAND ID | START INFORMATION | COMMAND |
|---|---|---|---|
| 0 | 0 | | Com (WORK) |
| | 1 | B | Com (MOVE TO C) |
| 1 | 0 | | Com (WARNING SOUND) |
| | 1 | C | Com (WORK) |
| | 2 | | Com (MOVE TO D) |
| 2 | 0 | D | Com (MOVE TO E) |
| | 1 | | Com (WARNING SOUND) |
| | 2 | | Com (WORK) |
| 99 | START INFORMATION ACQUISITION | | Com (POINT ACQUISITION) |

FIG. 11

| PLAN ID | COMMAND ID | START INFORMATION | COMMAND NAME |
|---|---|---|---|
| ... | ... | ... | ... |
| 1 | 0 | C | SOUND + WORK |
|  | 1 |  | MOVE TO D |
| ... | ... | ... | ... |

| COMMAND NAME | COMMAND | COMMAND SUB ID |
|---|---|---|
| SOUND + WORK | Com (WARNING SOUND) | 0 |
|  | Com (WORK) | 1 |
| MOVE TO D | Com (MOVE TO D) | 0 |
| ... | ... | ... |

FIG. 12

| PLAN ID | COMMAND ID | START INFORMATION | COMMAND |
| --- | --- | --- | --- |
| 0 | 0 |  | Com (WORK) |
|  | 1 | B | Com (MOVE TO C) |
| 1 | 0 |  | Com (WARNING SOUND) |
|  | 1 | C | Com (WORK) |
|  | 2 |  | Com (MOVE TO D) |
| 2 | 0 | D | Com (MOVE TO E) |
|  | 1 |  | Com (WARNING SOUND) |
|  | 2 |  | Com (WORK) |
| 3 | 0 | D | Com (MOVE TO D) |
|  | 1 |  | Com (WARNING SOUND) |
| . . . | . . . | . . . | . . . |

FIG. 13

| PLAN ID | COMMAND ID | START INFORMATION | COMMAND |
|---|---|---|---|
| 0 | 0 | Home0 | Com (WORK) |
| | 1 | Home1 | Com (MOVE TO C) |
| 1 | 0 | | Com (WARNING SOUND) |
| | 1 | C | Com (WORK) |
| | 2 | | Com (MOVE TO D) |
| 2 | 0 | D | Com (MOVE TO E) |
| | 1 | | Com (WARNING SOUND) |
| | 2 | | Com (WORK) |

FIG. 14

MOVEMENT CONTROL SYSTEM, MOVEMENT CONTROL METHOD, AND NON-TRANSITORY COMPUTER READABLE MEDIUM

CROSS REFERENCE TO RELATED APPLICATIONS

This application is based upon and claims the benefit of priority from the prior Japanese Patent Application No. 2021-178065, filed on Oct. 29, 2021, the entire contents of which are incorporated herein by reference.

FIELD

The present disclosure relates to a movement control system, a movement control method, and a non-transitory computer readable medium.

BACKGROUND

When a movable object such as a vehicle is operated according to an operation plan in a facility such as a warehouse or a factory to cause the movable object to carry out work such as parcel carriage, operation of the movable object may stop due to some factor. When a stoppage position is stored in the movable object, automated movement of the movable object from the stoppage position can be resumed.

When the stoppage position is not stored, an operator or the like needs to bring the movable object to an initial position, and automated movement needs to be started again from the initial position. Even when the operator is to return the movable object to the initial position, in a case where there are a plurality of initial positions, it is difficult to specify from which one of the initial positions the operation is to be resumed.

BRIEF DESCRIPTION OF THE DRAWINGS

FIG. 3 illustrates an example of an operation plan;

FIG. 10 illustrates an example of the operation plan according to a second embodiment;

FIG. 11 illustrates an example of the operation plan according to a third embodiment;

FIG. 12 illustrates an example of the operation plan and a command correspondence table according to the present embodiment;

FIG. 13 illustrates an example of the operation plan according to a seventh embodiment;

FIG. 14 illustrates an example of the operation plan according to a ninth embodiment;

DETAILED DESCRIPTION

Figure 1:
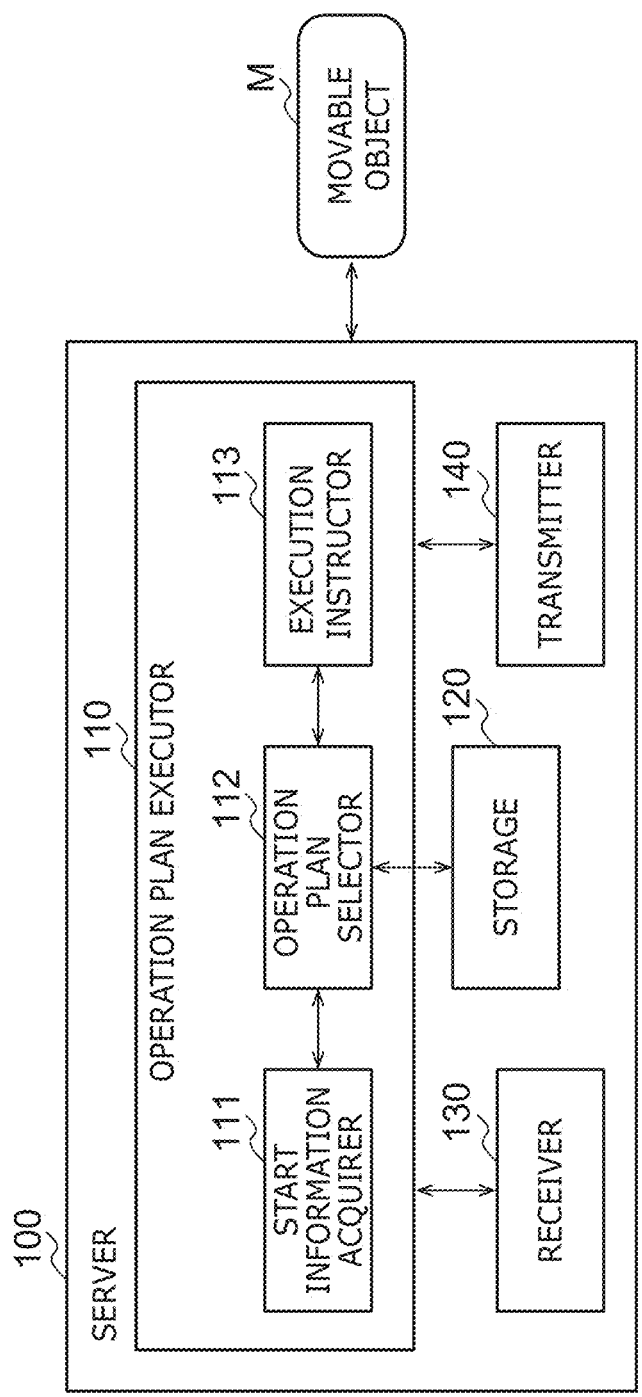
FIG. 1 is a block diagram of a movement control system according to a first embodiment.

According to one embodiment, a movement control system includes: a receiver configured to receive start information for deciding a start order from which execution of an operation plan is started, the operation plan including a plurality of orders for controlling a movable object; and an operation plan executor configured to start the execution of the operation plan from the start order decided based on the start information.

Hereinafter, embodiments of the present invention will be described with reference to the drawings. The same reference sign is assigned to the same constituents in the drawings, and descriptions thereof will be appropriately omitted.

First Embodiment

FIG. 1 is a block diagram of a movement control system according to the present embodiment. The movement control system of FIG. 1 is configured to control one or more movable objects M according to an operation plan in a space such as a warehouse or a facility. A movement environment where the movable object M can move (for example, drive or fly) is provided in the space. The movable object M is a device capable of automatedly moving on a ground or in a space, such as an automated guided vehicle (AGV), a mobile robot, or a drone. According to the present embodiment, a case is assumed where the movable object M is a device driving on the ground such as the AGV or the mobile robot, and parcel carriage is to be performed. The movable object M operates according to an operation plan managed by a server 100. The operation plan includes a plurality of orders for controlling the movable object M and a sequence for executing the orders. According to the present embodiment, execution or resumption of the operation plan from any plan or any order by the movable object M is realized. Thus, even in a case where the operation of the movable object M temporarily stops due to trouble such as a system failure in a mid-course of the operation plan, the execution of the operation plan can be resumed from a desired point. Hereinafter, the present embodiment will be described in detail.

The movement control system of FIG. 1 includes the server 100 and one or more movable objects M. In FIG. 1, only one movable object M is illustrated, but a plurality of movable objects M may be present. The server 100 includes an operation plan executor 110, a storage 120, a receiver 130, and a transmitter 140. The operation plan executor 110 includes a start information acquirer 111, an operation plan selector 112, and an execution instructor 113.

The receiver 130 is configured to communicate with an external apparatus in a wireless or wired manner and receive data or information. In a case of the wireless communication, one or more antennas are connected to the receiver 130. The external apparatus includes, for example, a terminal apparatus of a user who carries out work, management, or the like in a warehouse, a facility, or the like, the movable object M, or equipment (such as a camera or a monitor device) installed in the movement environment. A plurality of receivers 130 may be provided according to the number of types of devices that may be set as communication targets of the server 100 or the number of communication schemes to be used. The terminal apparatus may be a general computer apparatus including an input device (such as a keyboard, a mouse, a touch panel, or a voice input device), an output device (such as a display or a speaker), a control device, a communication device, and the like.

The transmitter 140 is configured to communicate with the external apparatus in a wireless or wired manner and transmit data or information. In a case of the wireless communication, one or more antennas are connected to the transmitter 140. The one or more antennas may be shared by the transmitter 140 and the receiver 130. A specific example of the external apparatus is similar to the case of the receiver 130. A plurality of transmitters 140 may be provided according to the number of types of devices that may be set as communication targets of the server 100 or the number of communication schemes to be used.

The storage 120 stores data of an operation plan for the movable object M set as a target to be controlled. An operation plan may be prepared for each of the movable objects M, and a single operation plan may be commonly applied to the plurality of movable objects M. In addition, the storage 120 may store map data of the movement environment, graph map data, specification information of each of the movable objects M, or the like. The map data stores detailed information of the movement environment (for example, a movement path, a position of an obstacle, a position of a shelf that keeps consignment, or the like). The map data may be created by the movable object M using a simultaneous localization and mapping (SLAM) technology. Alternatively, the map data may be drawing data for architecture or design of a facility. The graph map data may be created by analyzing the map data by a computer based on a graph map creation technology, or may be created by a person with reference to the map data. The graph map data is associated with the map data, and the server 100 can control the operation of the movable object M using the graph map data. The graph map data includes a plurality of nodes, and an edge connecting the nodes. Each of the nodes is associated with an actual point (point on the map data) in the movement environment. The edge is associated with a route between points corresponding to nodes at both ends of the edge.

Figure 2:
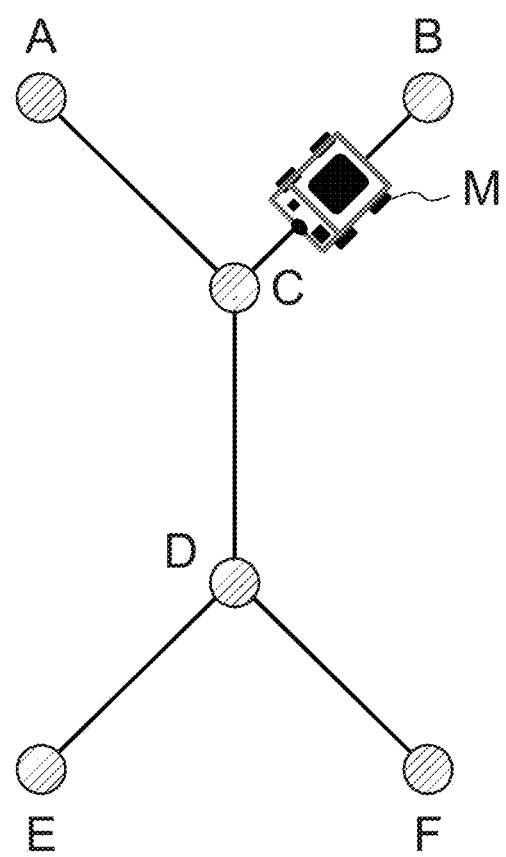
FIG. 2 illustrates an example of a graph map data of a movement environment.

FIG. 2 illustrates an example of a simplified movement environment including routes and points on which the movable object M moves. A plurality of points A, B, C, D, E, and F are illustrated. Routes are formed between the points A and C, the points B and C, the points C and D, the points D and E, and the points D and F. The movable object M cannot move between points where no route is formed. A route between points X and Y will be referred to as a route X-Y. The graph map data described above includes a plurality of nodes A, B, C, D, E, and F corresponding to the points A to F and edges connecting nodes. An edge corresponds to a route between points.

FIG. 3 illustrates data of an operation plan stored in the storage 120 in a table format. This operation plan is for operating the movable object M in the movement environment of FIG. 2. The operation plan includes a plurality of plans and an execution sequence of the plurality of plans. Plan IDs that are ascending numbers starting from 0 are assigned to the respective plans, and mean that the plans are executed in ascending sequence of the plan IDs. Each of the plans is acquired by bundling a plurality of procedures (purposes) necessary to achieve the operation plan as orders for each of the purposes. A plan in which a plan ID is 0 is referred to as a plan 0. Plans with other plan IDs are similarly referred to. The plan 0 is a plan in which the movable object M works at the point B, and moves to the point C. The plan 1 is a plan in which the movable object M emits a sound, then works, and thereafter moves to the point D. The plan 2 is a plan in which the movable object M moves to the point E, then emits a sound, and thereafter works.

Each of the plans includes one or more orders in a format of a command that can be executed by the movable object M. The command is a code that can be interpreted and executed by the movable object M. Each of the plans includes an execution sequence of orders (commands). In more detail, for each plan, command IDs that are numbers in ascending sequence starting from 0 are assigned to the respective commands, and mean that the commands are executed in ascending sequence of the command IDs. A command in which a command ID is 0 is referred to as a command 0. Commands with other subsequent command IDs are similarly referred to. The operation plan is executed by executing the commands in ascending sequence of the plan IDs and also in ascending sequence of the command IDs.

The operation plan includes start information for realizing start of execution (including a case of resumption) of the operation plan from a command (order) at any position or a plan at any position in the operation plan. The start information is provided for one or more commands in the operation plan. As a specific example of the start information, a value indicating a point ID (or a node ID) illustrated in FIG. 2 is stored. The command associated with the start information may be a command to be executed by the movable object M at the point corresponding to the point ID indicated by the start information. For example, when the operation of the movable object M is to be started from a certain point, a user brings the movable object M to the point to arrange the movable object M at the point, and transmits an operation start instruction including the point ID corresponding to the point as the start information from a terminal apparatus 200 or the like to the server 100. The server 100 specifies a command corresponding to the point ID indicated by the start information included in the operation start instruction as a start command (start order), and starts the execution (including a case of resumption) of the operation plan from the start command.

The start information acquirer 111 is configured to receive the operation start instruction for instructing start of the operation including the start information from the external apparatus such as the terminal apparatus 200 via the receiver 130, and acquire the start information from the operation start instruction. The user arranges the movable object M set as a target of the start of the operation at the point where the operation is desired to be started, and transmits the operation start instruction including the point ID corresponding to the arranged point as the start information to the server 100 using the terminal apparatus 200. A medium including the point ID is provided at the point corresponding to the point ID or a floor, a wall, or the like in the vicinity of the point, and the user may refer to the medium to specify the point ID. The medium may be printed character information or posted character information on paper.

When the start information is not included in the operation start instruction or the same point ID as the point ID indicated by the start information is not stored in the operation plan, the start information acquirer 111 may transmit via the transmitter 140 a transmission request for requesting the terminal apparatus 200 to transmit the start information. The start information acquirer 111 may acquire the start information by responding to the transmission request and receiving a response including the start information from the terminal apparatus 200.

The operation plan selector 112 is configured to acquire the start information acquired by the start information acquirer 111. The operation plan selector 112 detects the point ID indicated by the start information from the operation plan by a search, and sets a command (order) corresponding to the detected point ID, in other words, a command corresponding to the point ID in the plan including the detected point ID as the start command. The operation plan selector 112 decides to start the operation plan from the start command.

The execution instructor 113 transmits instruction data for instructing execution of the command selected by the operation plan selector 112 to the movable object M via the transmitter 140. The instruction data includes the command, and the movable object M executes the command included in the instruction data. Thus, the server 100 can cause the movable object M to start or resume the operation plan from the desired point. The execution instructor 113 also sequentially transmits the instruction data for instructing the movable object M to execute commands in sequence after the selected command according to an execution situation of the commands. Alternatively, commands to be executed after the selected command may be collectively transmitted together with the selected command in the plan including the selected command. Thereafter, the server 100 may transmit the commands in units of plan to the movable object M. The movable object M executes the commands received from the server 100 in ascending sequence of the command IDs.

The movable object M may determine whether its own device is present at the point at which the command included in the received instruction data is to be executed. When the movable object M is not present at the point, execution of the command may be avoided. In this case, the movable object M may transmit an error message to the server 100. The server 100 may transmit warning data indicating that the movable object M is not present at the point at which the command is to be executed to the terminal apparatus 200 of the user, and urge the user to arrange the movable object M at the point at which the command is to be executed. The movable object M may include a detector configured to detect a position where its own device is present. The detector of the movable object M may detect a position of its own device based on a mark representing the point provided in the movement environment using a camera or the like. When a position management server configured to manage the position of the movable object M is present, the detector of the movable object M may detect the position of its own device by communicating with the position management server.

Hereinafter, a motion example of the present embodiment will be described using a specific example. As the motion example, a case is assumed where in a state in which the movable object M is arranged at the point B, and the server 100 starts the operation plan illustrated in FIG. 2.

Figure 4:
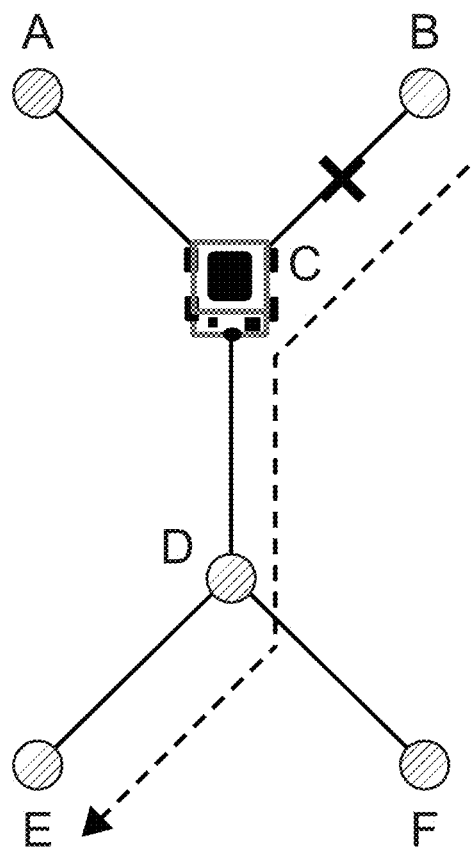
FIG. 4 is a diagram for describing a motion example of the first embodiment.

FIG. 4 is a diagram for describing the present motion example. In FIG. 4, a route on which the movable object M is expected to be moved by the operation plan is represented by a broken line.

The movable object M executes the command 0 in the plan 1 at the point B, and carries out work instructed by the command 0 (for example, reception of a parcel).

Next, the movable object M starts to move to the point C by executing the command 1 in the plan 1. It is assumed that in a mid-course of the movement of the movable object M, the operation of the movable object M has been interrupted, and the movable object M stops due to some accident (for example, system failure, drop of a parcel, tumble, or the like) on the route B-C. FIG. 4 illustrates a position marked by x at which the movable object M has stopped. The user monitoring the movable object M in the movement environment realizes that the operation of the movable object M has been interrupted, and decides that the work is to be resumed by the movable object M from the point C. The user moves to the stoppage point of the movable object M, picks up the movable object M to bring it to the point C, and brings down the movable object M. It is noted that the user may visually find the interruption of the operation of the movable object M, or may grasp occurrence of the interruption because of a notification about the interruption from the system.

When the movable object M is arranged at the point C, by operating the terminal apparatus 200, the user generates the start information indicating the point ID of the point C and transmits the operation start instruction including the start information to the server 100.

Figure 5:
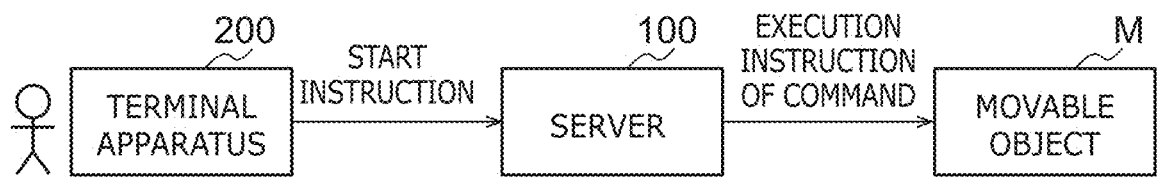
FIG. 5 illustrates an example in which an operation start instruction is transmitted to a server from a terminal apparatus.

FIG. 5 illustrates an example in which the operation start instruction is transmitted to the server 100 from the terminal apparatus 200 of the user.

The server 100 detects the start information included in the operation start instruction received from the terminal apparatus 200 of the user, and searches for and specifies a command corresponding to the start information in the operation plan. In the present example, the command corresponding to the point C indicated by the start information, that is, the command 1 in the plan 1, is specified as the start command.

Figure 6:
FIG. 6 illustrates an example in which an operation plan is searched for to specify a start command.

FIG. 6 illustrates an example in which the operation plan is searched for, and the server 100 specifies the command 1 as the start command.

The server 100 transmits the instruction data for instructing the execution of the command 1 to the movable object M. FIG. 5 illustrates an example in which the server 100 transmits the instruction data to the movable object M. The movable object M executes the command instructed by the instruction data. Thus, the execution of the operation plan is resumed from the command 1 in the plan 1 of the operation plan. That is, it is possible to cause the movable object M to resume the work from the point C. As a result, the command 0 in the plan 1 is skipped, and output of a warning sound is not executed. As a modified example, when the ID of the point C is associated with the command 0 in the plan 1, the execution of the operation plan can be resumed from the command 0 in the plan 1. A configuration may be adopted in which separate pieces of start information (for example, C-0 and C-1) are assigned to both the command 0 and the command 1 in the plan 1, so that the execution of the operation plan can also be resumed from either command.

When the user is to input the start information to the terminal apparatus 200 and provide the start information to the server 100, the start information may be input using a sensor device 210 provided in the terminal apparatus 200.

Figure 7:
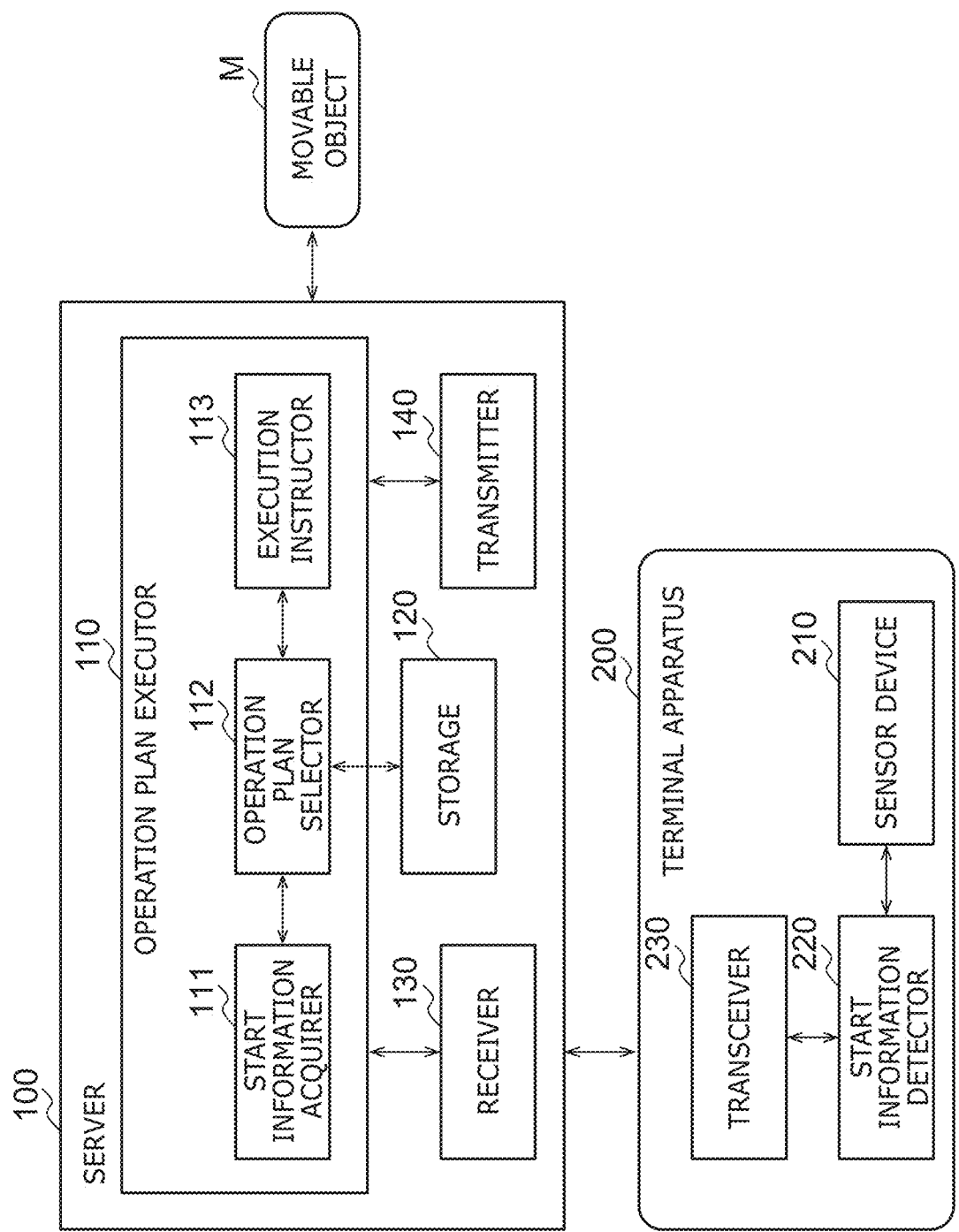
FIG. 7 illustrates an example in which a terminal apparatus including a sensor device is provided in the movement control system of FIG. 1.

FIG. 7 illustrates an example in which the terminal apparatus 200 including the sensor device 210 is provided in the movement control system of FIG. 1. The terminal apparatus 200 includes the sensor device 210, a start information detector 220, and a transceiver 230. The sensor device 210 is a camera, a barcode scanner, or the like. A medium including information (point ID) with which each point can be identified is provided at each point or a floor, a wall, or the like in the vicinity of the point or the like. Examples of the medium include a barcode, a two-dimensional barcode (for example, a QR code (registered trademark)), a unique code for recognition, an AR marker, a character, and the like. The user causes the sensor device 210 to sense the information from the medium. The start information detector 220 is configured to process the information sensed from the medium by the sensor device 210, and detect the point ID included in the information as the start information. The transceiver 230 is configured to transmit the acquired start information or the operation start instruction including the start information to the server 100. When the transmission request of the start information is received from the server 100, the terminal apparatus 200 transmits a response including the start information to the server 100. When the medium is character information and recognition processing of the character information is to be performed, the character recognition processing may be performed by another device such as the server 100 instead of the terminal apparatus 200.

In the example of FIG. 7, the sensor device 210, the start information detector 220, and the like are provided in the terminal apparatus 200 but may be provided in another external apparatus. The other external apparatus may be the movable object M.

Figure 8:
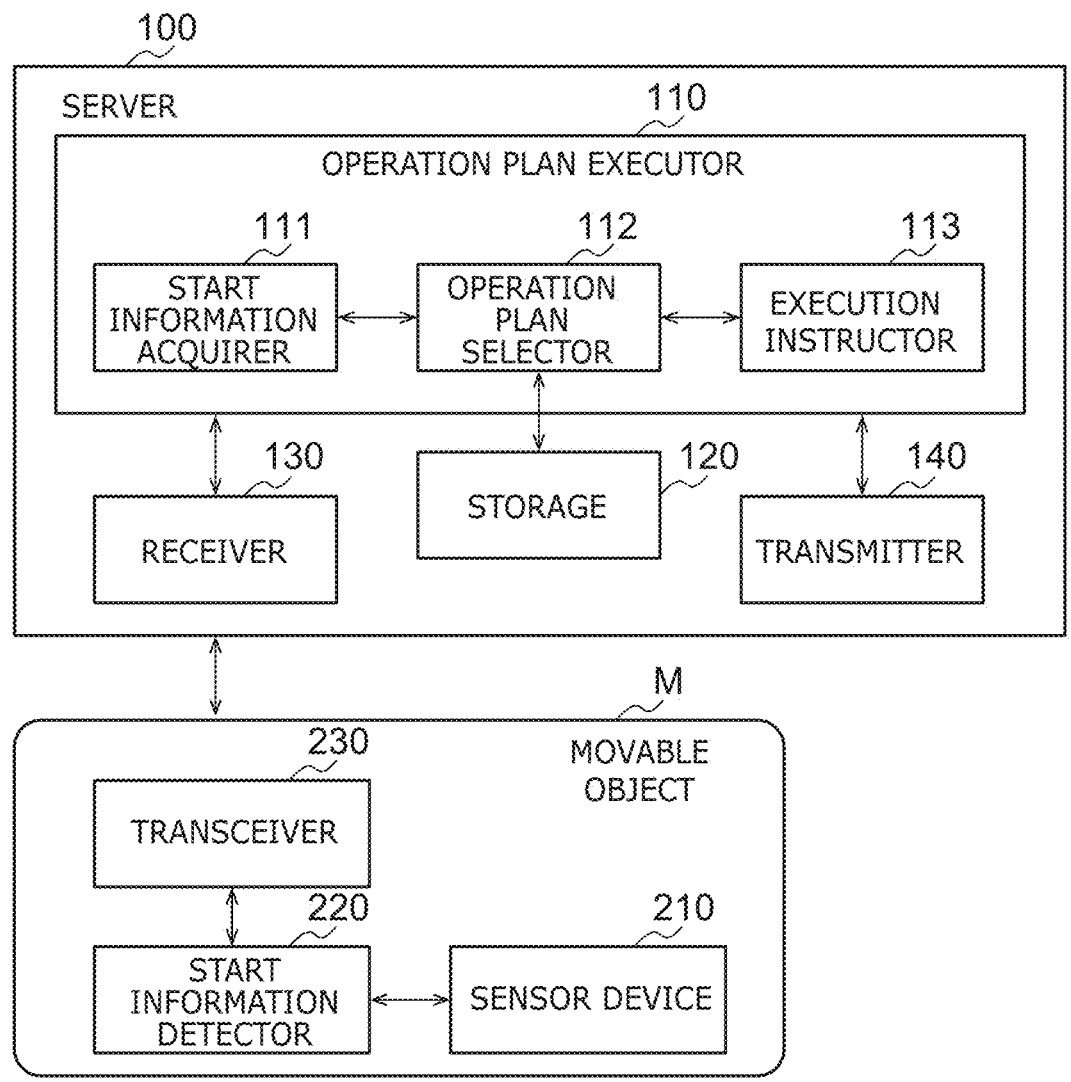
FIG. 8 illustrates a case where an external apparatus in which a sensor device and the like are provided is a movable object.

FIG. 8 illustrates a case where the external apparatus in which the sensor device 210, the start information detector 220, and the like are provided is the movable object M. The same reference sign is assigned to an element having the same name as that of FIG. 7, and redundant descriptions will be omitted. The movable object M senses the information from the medium by the sensor device 210 based on, for example, an instruction of the user or a transmission request from the server 100, and the start information detector 220 processes the sensed information to detect the point ID. The transceiver 230 includes the start information including the point ID in the operation start instruction or the response to the transmission request to be transmitted to the server 100. The movable object M may detect a position where its own device is present through a method such as self position estimation by a camera or radar, and acquire the point ID corresponding to the detected position. When the medium is the character information and the point ID is to be detected by the recognition processing of the character information, the character recognition processing may be performed by another device such as the server 100.

As still another example of the other external apparatus, the character recognition processing may be performed by a monitor device including a camera capable of monitoring each point or the like. The camera is configured to pick up an image of an area including the point, and a character of the point ID included in the picked-up image is recognized by image analysis. The camera acquires the recognized point ID, and transmits the start information including the point ID to the server 100. The camera may acquire the start information based on an instruction from the terminal apparatus 200. Alternatively, the camera may acquire the point ID by image pickup in response to the transmission request from the server 100. When the medium is character information, and the point ID is to be detected by the recognition processing of the character information, the character recognition processing may be performed by another device such as the server 100.

Figure 9:
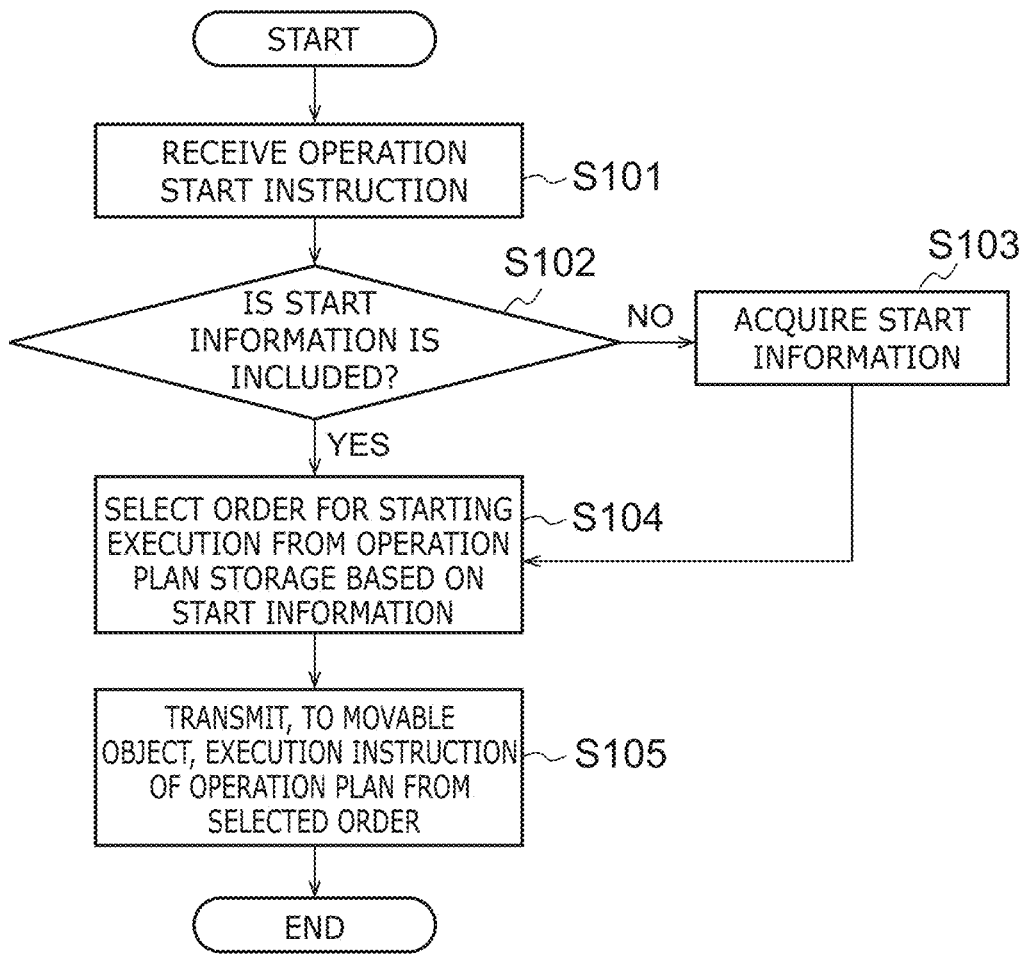
FIG. 9 is a flowchart illustrating an example of an operation of a server according to the first embodiment.

FIG. 9 is a flowchart illustrating an example of the operation of the server 100 according to the present embodiment. When the operation start instruction is received (S101), the start information acquirer 111 checks whether the start information (for example, the point ID) is included in the operation start instruction (S102). When the start information is not included, by transmitting the transmission request of the start information to the external apparatus, the response including the start information is received (S103). When the start information is included in the operation start instruction or when the response including the start information is received, the order (command) for starting or resuming the execution of the operation plan is selected based on the start information (S104). The server 100 transmits the instruction data for instructing the execution of the selected order and subsequent orders (orders in the subsequent sequence after the selected order) to the movable object M (S105). The movable object M executes the order instructed by the instruction data received from the server 100.

As described above, according to the present embodiment, when the start information is associated with the order (command) in the operation plan and the operation plan (including resumption) is to be started, by designating the start information, the operation plan can be started from any point (any order or any plan) in the operation plan.

Second Embodiment

The start information is information (point ID) for identifying the point according to the first embodiment, but the start information may be information for identifying the order (command) (command identification information).

FIG. 10 illustrates an example of the operation plan according to the present embodiment. Command identification information is stored in a column of the start information. For example, Sound1 is command identification information for identifying a command for outputting a particular warning sound. The terminal apparatus 200 or the like transmits the operation start instruction including, as the start information, the command identification information of the command with which the execution of the operation plan is desired to be started. The operation plan selector 112 of the server 100 specifies a command corresponding to the command identification information indicated by the start information from the operation plan. For example, when the start information indicates Sound1, the command 0 in the plan 1 is specified as the start command.

As described above, according to the present embodiment, by using the command identification information as the start information, the user can easily designate the command with which the operation plan is desired to be started.

Third Embodiment

When the start information is not included in the operation start instruction according to the first embodiment, the operation plan selector 112 transmits the transmission request of the start information. As an example of an embodiment for realizing this operation, the order (command) for transmitting the transmission request may be added to the operation plan, and the transmission request may be transmitted when the operation plan selector 112 executes this command.

FIG. 11 illustrates an example of the operation plan according to the present embodiment. "Start information acquisition" is stored in a column of the command ID as a label indicating acquisition of the start information. In a column of the command, a point acquisition command for instructing the transmission of the transmission request is stored in a row corresponding to this label "start information acquisition". The point acquisition command has a format that can be executed by the operation plan selector 112.

When the start information is not included in the operation start instruction, the operation plan selector 112 searches for the label "start information acquisition" from the column of the command ID in the operation plan. A command (point acquisition command) corresponding to the "start information acquisition" detected by the search is specified from the column of the command. The operation plan selector 112 executes the point acquisition command. Thus, the operation plan selector 112 generates a transmission request of the start information, and transmits the transmission request to the external apparatus such as the terminal apparatus 200.

As described above, according to the present embodiment, by including the label "start information acquisition" and the point acquisition command in the operation plan, the operation for transmitting the transmission request of the start information can be easily realized.

Fourth Embodiment

According to the first embodiment, the point ID is stored in advance in the column of the start information in the operation plan. According to the present embodiment, the column of the start information is set to be blank as an initial state. The operation plan selector 112 instructs the movable object to execute orders in sequence from a first order with regard to the plurality of orders in the operation plan. The operation plan selector 112 adds the point ID to the column of the start information according to an execution situation of the operation plan. When the operation of the movable object M has been suspended and the operation is to be resumed, the operation plan selector 112 specifies a command corresponding to the point ID most recently added in the operation plan as the start command.

For example, in the specific example illustrated in FIG. 4 described above, at the point B, when it is decided that the command 1 in the plan 0 (order of move to the point C) is to be transmitted to the movable object M, a value indicating the point B is added in association with the command 1 in the plan 0 in the operation plan as the start information. That is, the operation plan selector 112 stores the value indicating the point B in association with the command 1. The point B corresponds to the point of the movable object M at which the command 1 is performed. It is noted that timing for storing the value indicating the point B may be after the instruction data for instructing the execution of the command 1 is transmitted, may be before the instruction data is transmitted, or may be at the same time as the transmission of the instruction data. A command is previously set to which the start information is registered among the commands in the operation plan. A command with which the start information is associated is previously set, and the operation plan selector 112 of the server 100 associates only the previously set command with the start information.

When the operation of the movable object M has been interrupted due to an accident in a mid-course of the move to the point C, the operation plan selector 112 reads the point ID (in the present example, the ID "B" of the point B) most recently stored (added) in the operation plan. The operation plan selector 112 decides that the execution of the operation plan is resumed from the command corresponding to the ID of the point B (command 1). The user may transmit the operation start instruction that does not include the start information to the server 100 from the terminal apparatus 200. When the movable object M tumbles or drops a parcel on the route B-C, the user corrects a posture of the movable object M or loads the dropped parcel onto the movable object M, and then transmits the operation start instruction to the server 100.

In the above descriptions, the case where the start information is the position information indicating the point has been described, but as in the second embodiment, a case where the start information is a command identification information (identification information for identifying a command or identification information for identifying an order) can also be similarly implemented.

As described above, according to the present embodiment, since the user does not need to input the start information, the operation plan can be easily resumed.

Modified Example of Fourth Embodiment

The operation plan selector 112 manages a history of an executed command among the plurality of orders (commands) in the operation plan instead of the addition of the start information to the operation plan. The execution history of the command may be stored in the storage 120. When the execution of the operation plan has been temporarily stopped and then the execution of the operation plan is to be resumed, the operation plan selector 112 decides a command for resuming the execution of the operation plan based on the history. For example, the command most recently decided to be executed in the history or the command most recently instructed to be executed by the movable object M is decided as the command for resuming the execution of the operation plan.

Fifth Embodiment

According to the first embodiment, the start information is directly input to the terminal apparatus 200 from the input device or the like by the user, but a list of the start information may be transmitted to the terminal apparatus 200 from the operation plan selector 112 of the server 100, and the user may select the start information from the list displayed on the display of the terminal apparatus 200.

The operation plan selector 112 of the server 100 acquires all the start information (for example, the point IDs) included in the column of the start information in the operation plan, and generates a list including the acquired start information. The operation plan selector 112 transmits the list to the terminal apparatus 200. When the operation of the movable object M is stopped, the user causes the list to be displayed on the display of the terminal apparatus 200, and selects the start information from the list.

The terminal apparatus 200 transmits the selected start information or the operation start instruction including the selected start information to the server 100. Timing at which the list is to be transmitted to the terminal apparatus 200 may be any timing. For example, the timing may be when the operation plan is executed for the first time, or may be when the execution of the operation plan is resumed in a case where the execution of the operation plan has been suspended. Alternatively, the timing may be when an acquisition request for requesting acquisition of the list is received from the terminal apparatus 200, or may be other timing.

As described above, according to the present embodiment, by presenting the list of the start information to the user, the user can easily decide the start information for specifying the command for starting the operation plan.

Sixth Embodiment

The command in the format that can be executed by the movable object M is included in the operation plan of the first embodiment. According to a sixth embodiment, only identification information (command name) for collectively identifying one or more commands is stored in the operation plan, and a table (command correspondence table) in which the command name and the one or more commands are associated with each other is separately provided. The command correspondence table may be stored in the storage 120.

The command name may be in a format easily visually understood by the user, or may be a unique format easily managed by the server 100. The command name does not necessarily need to be associated with only one command, and a plurality of operation commands may be associated with one command name. For example, when the movable object M is to perform loading, move to a loading location, grasp of a parcel position, pickup of a parcel, and the like may be needed. One command name may be collectively assigned to the grasp of the parcel position and the pickup among these operations, and both a command for the grasp of the parcel position and a command for the pickup may be associated with the command name. IDs (referred to as command sub IDs) indicating execution sequences may be assigned to the plurality of commands associated with the one command name. In the operation plan, a command ID may be assigned to the command name.

The start information may be associated in units of the command name. In this case, the plurality of commands associated with the command name corresponding to the start information which is, for example, designated by the user may be specified, and the plurality of specified commands may be executed in the order indicated by the command sub IDs.

FIG. 12 illustrates an example of the operation plan and the command correspondence table according to the present embodiment. In the operation plan in a top diagram, "sound+work" is stored as a command name indicating an operation bundling output of a warning sound and work. In the command correspondence table in a bottom diagram, two commands including a command for instructing the output of the warning sound and a command for carrying out the work are associated with the command name "sound+work". A sequence to be executed of each of the commands is indicated by a command sub ID. This means that commands are to be executed from a command with a smaller command sub ID.

In the example of FIG. 12, the start information is assigned in units of the command name, but the start information may be assigned in units of command. In this case, the column of the start information may be deleted in the operation plan, and the column of the start information may be added to the command correspondence table. Thus, it is possible to designate the command for starting the operation plan with still finer classifications.

As described above, according to the present embodiment, it is possible to create the operation plan easily understood or managed by the user or the server 100.

Seventh Embodiment

The start information with the same value may be included in a plurality of plans in the operation plan. For example, when the movable object M reciprocates on the same route, the movable object M passes through the same point multiple times. In this case, the same start information may be assigned to both a command to be executed at the time of move on an outbound route and a command to be executed at the time of move on an inbound route.

FIG. 13 illustrates an example of the operation plan according to the present embodiment. The plan 3 and subsequent plans are added to the operation plan of FIG. 3. In the plan 3, a command for carrying out move to the point D, a command for outputting a warning sound at the point D, and the like are included. In the command for carrying out move to the point D, "D" indicating an ID of the point D is stored as the start information. As a result, the operation plan includes two pieces of the same start information "D".

In this manner, when the plurality of pieces of the same start information are included, the operation plan selector 112 can decide the start command in the operation plan from the start information which is, for example, designated from the user as will be described below.

As a first method, the operation plan selector 112 performs a search from a top or a bottom of the operation plan in sequence, and sets a command corresponding to the start information that has been hit in an n-th place as the start command. That is, in a plan including the start information hit in the n-th place, a command associated with the start information is set as the start command. A value of "n" may be a predetermined value. In addition, the value may be variable according to the execution situation of the operation plan. For example, the value of "n" may be decided according to an elapsed time period from a start clock time of the operation plan. In addition, the value of "n" may be decided by the user, and the value of "n" may be transmitted to the server 100 from the terminal apparatus 200.

As a second method, plans including the respective start information with regard to all the start information hit in the search are transmitted to the terminal apparatus 200 of the user and displayed on the display. The user decides a plan to be started from, and transmits an ID of the decided plan to the server 100. The operation plan selector 112 of the server 100 decides to start from the command associated with the start information in the plan designated by the user.

As described above, according to the present embodiment, even when the plurality of pieces of start information with the same value are included in the operation plan, the command for resuming the operation can be specified, and the operation can be resumed.

Eighth Embodiment

According to the first embodiment, when the start information is transmitted from the terminal apparatus 200 or the like of the user to the server 100, the same value as the start information included in the operation plan needs to be designated. However, as long as the start information to be transmitted to the server 100 and the start information in the operation plan can be associated with each other, values of those pieces of information may be different from each other.

For example, the start information acquired by the server 100 from the external apparatus such as the terminal apparatus 200 is set as "a", the start information in the operation plan is set as "a", and a conversion table in which "a" and "a" are associated with each other is stored in the storage 120. When the start information "a" is received from the terminal apparatus 200 or the like, the server 100 converts "a" into "a" using the conversion table, and searches for the operation plan using the converted "a" as the start information.

In addition, by adding a prefix or a suffix to the start information received in the server 100 or the start information in the operation plan, a correspondence relationship between those pieces of information be grasped. For example, information obtained by adding a prefix "pos_" to the start information acquired in the server 100 is set as the start information in the operation plan. For example, when the start information received in the server 100 is "a", "pos_a" obtained by adding a prefix "pos_" to "a" is created, and the operation plan is searched for using "pos_a" as the start information. A suffix instead of a prefix may be added, or both a prefix and a suffix may be added. Herein, an example has been illustrated where at least one of a prefix and a suffix is added to the start information received in the server 100, but a method of adding at least one of a prefix and a suffix to the start information in the operation plan can also be adopted.

As described above, according to the present embodiment, the format of the start information received in the server 100 and the format of the start information in the operation plan can be mutually different. Thus, for example, by using the value that the user easily understands as the start information to be transmitted to the server 100, the designation of the start information by the user is facilitated.

Ninth Embodiment

A mode is illustrated in which the same operation plan can be applied to the plurality of movable objects M with mutually different points set as departure points.

Figure 15:
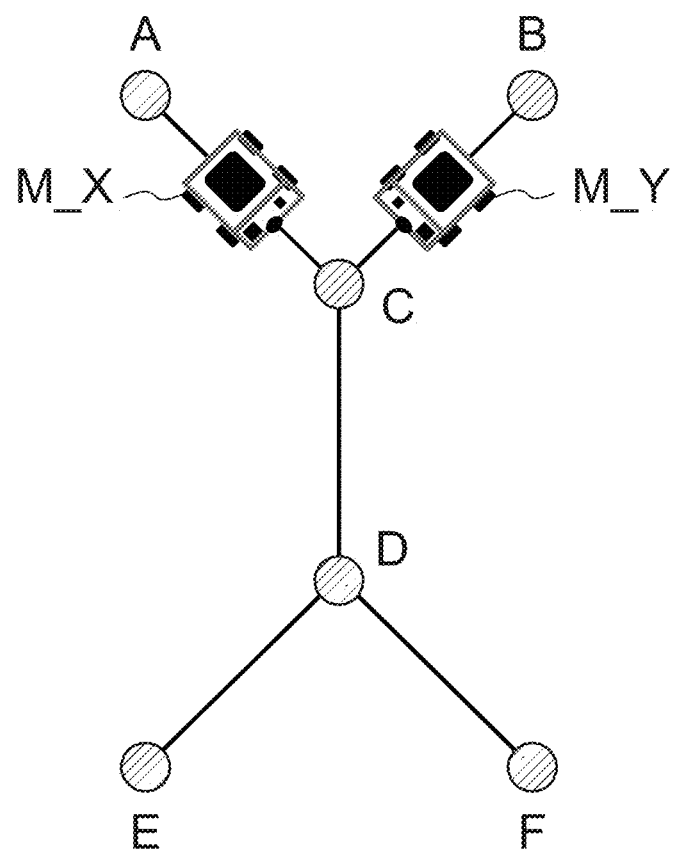
FIG. 15 illustrates an example of a movement environment of the operation plan according to the ninth embodiment.
Figure 16:
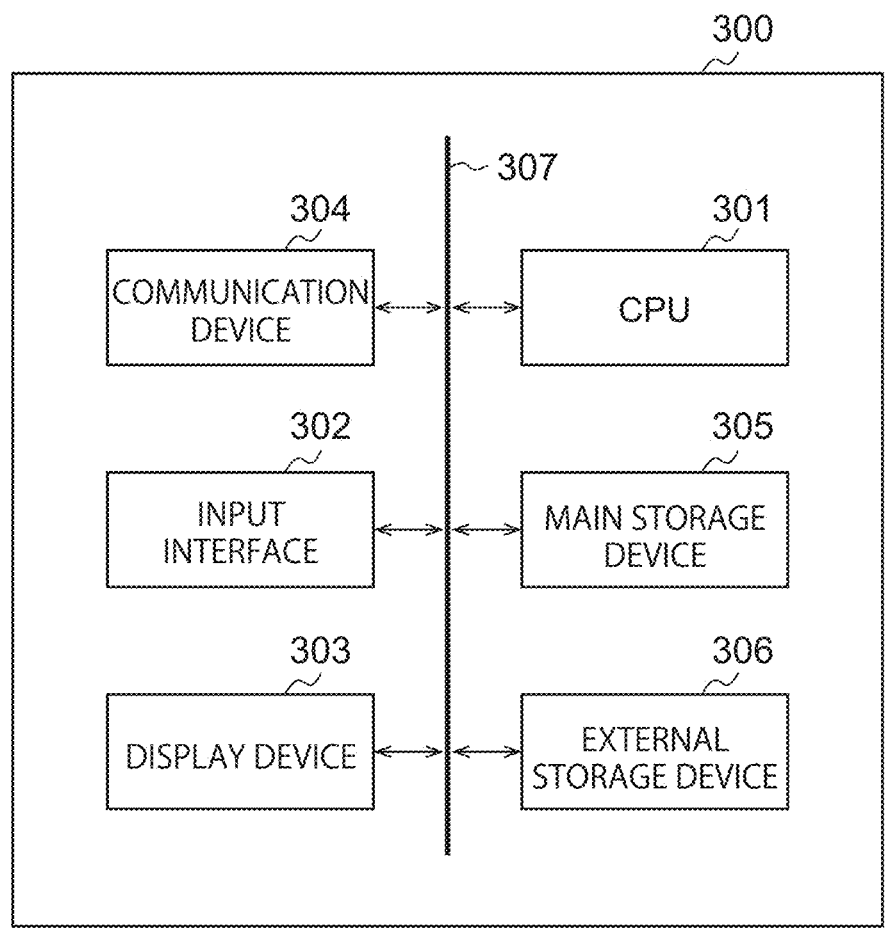
FIG. 16 is a block diagram illustrating an example of a hardware configuration of the server.

FIG. 14 illustrates an example of the operation plan according to the present embodiment. The operation plan of FIG. 14 can be applied to a plurality of movable objects M with the different departure points. FIG. 15 illustrates an example of the movement environment of the operation plan according to the present embodiment. For example, in the movement environment illustrated in FIG. 15, a departure point of a movable object M_X is set as the point A, and a departure point of a movable object M_Y is set as the point B. The operation plan is the same for the movable objects M_X and M_Y except that the departure points are different from each other. At this time, a common value is used in the column of the start information in the operation plan as position information corresponding to the point A and the point B. In the present example, Home0 and Home1 are respectively associated with the command 0 in the plan 0 and the command 1 in the plan 0 as the start information.

By using the same start information for the different points in this manner, the same operation plan can be applied to the plurality of movable objects M using the different points. For example, in a case where the operation plan has been interrupted due to trouble during move of the movable object M_X or the movable object M_Y to a position C and the operation plan is to be resumed or the like, the same start information (for example, Home1) is designated for the movable objects M_X and M_Y. Thus, the move to the position C can be resumed from a midway on the route A-C or the route B-C. In addition, even when the execution of the operation plan is performed from the beginning for the movable objects M_X and M_Y, the same start information (for example, Home0) can be designated. At this time, a recording medium (for example, such as a barcode) including the same start information (for example, Home0) may be installed at both the point A corresponding to an initial position of the movable object M_X and the point B corresponding to an initial position of the movable object M_Y, and the movable object M may be caused to read the same start information. Alternatively, initial positions (the point A in the case of the movable object M_X and the point B in the case of the movable object M_Y) may be respectively previously stored in the movable objects M_X and M_Y, and the start information including the initial positions may be transmitted to the server 100. In this manner, by using the same operation plan for the movable objects M_X and M_Y, recovery from the respective initial positions can be realized.

As described above, according to the present embodiment, by assigning the same start information to the different positions, the same operation plan can be applied to the plurality of movable objects M.

(Hardware Configuration)

FIG. 21 illustrates a hardware configuration of the server 100 of FIG. 1. The server 100 according to the present embodiment is configured with a computer device 300. The computer device 300 includes a CPU 301, an input interface 302, a display device 303, a communication device 304, a main storage device 305 and an external storage device 306, and these are connected to each other with a bus 307.

The CPU (Central Processing Unit) 301 executes a computer program (operation management program) which realizes the above-described respective functional configurations of the server 100 on the main storage device 305. The computer program may not be a single program but a plurality of programs or a combination of scripts. By the CPU 301 executing the computer program, the respective functional configurations are realized.

The input interface 302 is a circuit for inputting an operation signal from the input device such as a keyboard, a mouse and a touch panel, to the server 100. The input function of the server 100 can be constructed on the input interface 302.

The display device 303 displays data or information output from the server 100. While the display device 303 is, for example, an LCD (Liquid Crystal Display), a CRT (Cathode-Ray Tube), and a PDP (Plasma Display Panel), the display device 303 is not limited to this. The data or the information output from the computer device 300 can be displayed by this display device 303. The output device of the server 100 can be constructed on the display device 303.

The communication device 304 is a circuit for the server 100 to communicate with an external device in a wireless or wired manner. Information can be input from the external device via the communication device 304. Information input from the external device can be stored in a DB.

The main storage device 305 stores a program (an information processing program) which realizes processing of the present embodiment, data required for execution of the program, data generated by execution of the program, and the like. The program is developed and executed on the main storage device 305. While the main storage device 305 is, for example, a RAM, a DRAM and an SRAM, the main storage device 305 is not limited to this. The storage in each embodiment may be constructed on the main storage device 305.

The external storage device 306 stores the above-described program, data required for execution of the program, data generated by execution of the program, and the like. These kinds of program and data are read out to the main storage device 305 upon processing of the present embodiment. While the external storage device 306 is, for example, a hard disk, an optical disk, a flash memory and a magnetic tape, the external storage device 306 is not limited to this. The storage in each embodiment may be constructed on the external storage device 306.

Note that the above-described program may be installed in the computer device 300 in advance or may be stored in a storage medium such as a CD-ROM. Further, the program may be uploaded on the Internet.

Further, the server 100 may be configured with a single computer device 300 or may be configured as a system including a plurality of computer devices 300 which are connected to each other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A movement control system comprising:
a receiver receiving start information for deciding
  (i) a target operation plan executing from among a plurality of operation plans which include a plurality of orders arranged in sequence controlling movement of a movable object, and
  (ii) a start order which is an order started from among the plurality of orders in the target operation plan executing;
an operation plan executor deciding the target operation plan from among the plurality of operation plans and the start order from among the plurality of orders in the target operation plan based on the start information; and
a transmitter transmitting, to the movable object, instruction data for instructing execution of the target operation plan from the start order.

2. The movement control system according to claim 1, wherein
the instruction data is data that instructs the execution of the start order and an order arranged after the start order in the target operation plan.

3. The movement control system according to claim 1, wherein
the receiver receives an operation start instruction including the start information, and
the operation plan executor decides the start order based on the start information included in the operation start instruction.

4. The movement control system according to claim 3,
a wherein the transmitter is configured to transmit a transmission request for requesting transmission of the start information when the start information is not included in the operation start instruction.

5. The movement control system according to claim 4, wherein
the transmitter transmits the transmission request to a terminal apparatus operable by the movable object or a user.

6. The movement control system according to claim 4, wherein
the plurality of operation plans include a transmission order for instructing transmission of the transmission request, and when the start information is not included in the operation start instruction, the operation plan executor transmits the transmission request by detecting the transmission order from the plurality of operation plans and executing the transmission order.

7. The movement control system according to claim 1, wherein
the target operation plan includes at least one piece of position information associated with at least one order among the plurality of orders,
the start information includes the position information, and
the operation plan executor detects an order corresponding to the position information included in the start information in the target operation plan, and sets the detected order as the start order.

8. The movement control system according to claim 1, wherein
the target operation plan includes identification information for identifying at least one order among the plurality of orders, and the identification information is associated with the at least one order,
the start information includes identification information for identifying the start order, and
the operation plan executor detects an order corresponding to the identification information included in the start information in the operation plan, and sets the detected order as the start order.

9. The movement control system according to claim 4, further comprising:
a sensor device configured to sense a movement environment of the movable object; and
a start information detector configured to perform sensing via the sensor device based on the transmission request, and detect the start information from sensing information,
wherein
the operation plan executor acquires the start information detected by the start information detector.

10. The movement control system according to claim 9, further comprising:
the movable object,
wherein
the movable object includes the sensor device and the start information detector.

11. The movement control system according to claim 9, wherein
a recording medium including the start information is provided in the movement environment, and
the start information detector reads the start information from the recording medium via the sensor device.

12. The movement control system according to claim 11, wherein
the recording medium is a barcode, a two-dimensional barcode, an AR (Augmented Reality) marker, or character information.

13. The movement control system according to claim 7, wherein
the operation plan executor transmits a transmission request for requesting transmission of the start information to the movable object,
the transmission request includes information for instructing the movable object to transmit start information including the position information, and
the operation plan executor acquires the position information included in the start information received from the movable object, detects an order corresponding to the acquired position information, and sets the detected order as the start order.

14. The movement control system according to claim 7, wherein
the operation plan executor instructs the movable object to execute the target operation plan from a first order arranged at a top of the plurality of orders,
the operation plan executor stores position information indicating the order being executed that is received from the movable object, and
in a case where execution of the target operation plan is temporarily stopped due to an emergency stop instruction from a user or due to any cause on the movable object and then the execution of the target operation plan is to be resumed, the target operation plan executor specifies an order corresponding to the position information, and sets the specified order as the start order.

15. The movement control system according to claim 1, wherein
the operation plan executor manages a history of orders already executed among the plurality of orders, and
in a case where execution of the target operation plan is temporarily stopped due to an emergency stop instruction from a user or due to any cause on the movable object and then the execution of the target operation plan is to be resumed, the operation plan executor decides the start order corresponding to an order for resuming in the target operation plan based on the history.

16. The movement control system according to claim 1, wherein
the operation plan executor transmits one or more candidates of the start information to a terminal apparatus of a user, receives a candidate selected among the one or more candidates from the terminal apparatus, and decides the start order based on the received candidate.

17. The movement control system according to claim 7, wherein
the target operation plan includes a plurality of pieces of position information which are identical to the position information included in the start information,
the operation plan executor transmits a selection request for one of orders corresponding to the plurality of pieces of position information to a terminal apparatus of a user, receives a response including the order selected from the terminal apparatus, and sets the order included in the response as the start order.

18. The movement control system according to claim 8, wherein
the target operation plan includes a plurality of pieces of identification information which are identical to the identification information included in the start information,
the operation plan executor transmits a selection request for one of orders corresponding to the plurality of pieces of identification information to a terminal apparatus of the user, receives a response including the order selected from the user, and sets the order included in the response as the start order.

19. The movement control system according to claim 1, further comprising:
the movable object which executes the start order and an order arranged after the start order in the target operation plan to move in a movement environment.

20. A movement control method comprising:
receiving start information deciding
(i) a target operation plan executing from among a plurality of operation plans which include a plurality of orders arranged in sequence controlling movement of a movable object, and
(ii) a start order which is an order started from among the plurality of orders in the target operation plan to be executed;
deciding the target operation plan from among the plurality of operation plans and the start order from among the plurality of orders in the target operation plan based on the start information; and
transmitting, to the movable object, instruction data instructing execution of the target operation plan from the start order.

21. A non-transitory computer readable medium having a computer program stored therein causing a computer to perform processes comprising:
receiving start information deciding
(i) a target operation plan executing from among a plurality of operation plans which include a plurality of orders arranged in sequence controlling movement of a movable object, and
(ii) a start order which is an order starting from among the plurality of orders in the target operation plan to be executed;
deciding the target operation plan from among the plurality of operation plans and the start order from among the plurality of orders in the target operation plan based on the start information; and
transmitting, to the movable object, instruction data instructing execution of the target operation plan from the start order.

* * * * *